US006937366B2

(12) United States Patent
Ejiri

(10) Patent No.: US 6,937,366 B2
(45) **Date of Patent: *Aug. 30, 2005**

(54) DATA COMMUNICATION SYSTEM

(75) Inventor: Seishi Ejiri, Kawasaki (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/997,706

(22) Filed: Dec. 23, 1997

(65) Prior Publication Data

US 2002/0048049 A1 Apr. 25, 2002

(30) Foreign Application Priority Data

Dec. 26, 1996 (JP) ............................................ 8-348049

(51) Int. Cl.7 ................................................ H04N 1/00
(52) U.S. Cl. ...................... 358/434; 358/1.15; 358/442
(58) Field of Search .............................. 358/1.15, 1.16, 358/400, 402, 403, 405, 434, 436, 437, 440, 444, 468, 442

(56) References Cited

U.S. PATENT DOCUMENTS 5,293,250 A * 3/1994 Okumura et al. ........... 358/402
5,377,017 A * 12/1994 Lam ........................... 358/405
5,552,901 A * 9/1996 Kikuchi et al. ............. 358/468
5,559,721 A * 9/1996 Ishii ........................... 364/514
5,579,126 A * 11/1996 Otsuka ....................... 358/403
5,633,731 A * 5/1997 Maemura .................... 358/468
5,644,404 A * 7/1997 Hashimoto et al. ......... 358/402
5,684,607 A * 11/1997 Matsumoto ................. 358/442
5,720,014 A * 2/1998 Ikeda et al. ................ 358/1.15
5,798,845 A * 8/1998 Baek et al. ................. 358/434
5,838,459 A * 11/1998 Hashimoto .................. 358/402
6,119,142 A * 9/2000 Kosaka ....................... 709/200
6,266,162 B1 * 7/2001 Okamura et al. ........... 358/468
6,377,580 B2 * 4/2002 Matsumoto et al. ........ 370/401
6,567,178 B2 * 5/2003 Tashima .................... 358/1.15
6,639,693 B1 * 10/2003 Ejiri et al. .................. 358/434

FOREIGN PATENT DOCUMENTS

JP 9018498 A * 1/1997 .......... H04L/12/28

* cited by examiner

*Primary Examiner*—Joseph R. Pokrzywa
(74) *Attorney, Agent, or Firm*—Fitzpatrick, Cella, Harper & Scinto

(57) ABSTRACT

In a system in which a facsimile apparatus is connected to a LAN (Local Area Network) to which a plurality of computer terminals are connected, image data obtained by reading an original image by the scanner of the facsimile apparatus under the control of the operation unit of the facsimile apparatus is transmitted to a destination designated by the operation unit. In this operation, if a user ID is designated, transmitted image data and information (destination, transmission time/date, or the like) related to transmission is transferred to the LAN to notify the information to a user corresponding to the user ID. In this manner, data communication performed by a local operation of the facsimile apparatus and data communication performed by a remote designation from the computer terminal can be managed together.

6 Claims, 11 Drawing Sheets

DATA COMMUNICATION SYSTEM

BACKGROUND OF THE INVENTION

1. Field of the Invention

The present invention relates to a data communication system for transmitting data to a transmission destination and, more particularly, to a data communication system capable of connecting a computer terminal.

2. Description of the Related Art

As a conventional data communication system, a system in which a facsimile apparatus and a personal computer (PC) are connected to each other to transmit facsimile data according to a request from the PC or to transfer data received or read by the facsimile apparatus to the PC is known. A stand-alone type facsimile apparatus which performs not only an operation based on PC control but also a function of transmitting facsimile data according to a designation from the operation unit of the facsimile apparatus is also known.

It is also known that a facsimile apparatus is connected to a local area network (LAN) to which a plurality of PCs are connected to exchange data between the PCs on the LAN and the facsimile apparatus. Transmission of original information is designated by an application installed in the PCs on the LAN, and the original information is transferred to the facsimile apparatus to transmit the information to a transmission destination. Log information related to this transmission is managed by the application on the PCs.

However, when a conventional facsimile apparatus transmits data according to a designation from the operation unit of the facsimile apparatus, even if a PC is connected to the facsimile apparatus, information related to this transmission such as a transmission destination, transmission time, and a transmission result cannot be known on the PC side. Therefore, information related to transmission cannot be managed together.

SUMMARY OF THE INVENTION

It is an object of the present invention to provide a data communication system which is free from the above problems.

It is another object of the present invention to provide a data communication system in which log information related to data communication based on a manual operation of the data communication system can be managed in units of users.

It is still another object of the present invention to provide a data communication system in which data communication based on a designation from a data processing apparatus and data communication based on manual transmission of the data communication system can be easily managed together.

The above object and the other objects of the present invention will be apparent from the following detailed description based on the accompanying drawings.

DESCRIPTION OF THE PREFERRED EMBODIMENTS

Embodiments of the present invention of the present invention will be described below with reference to the accompanying drawings.

(First Embodiment)

Figure 1:
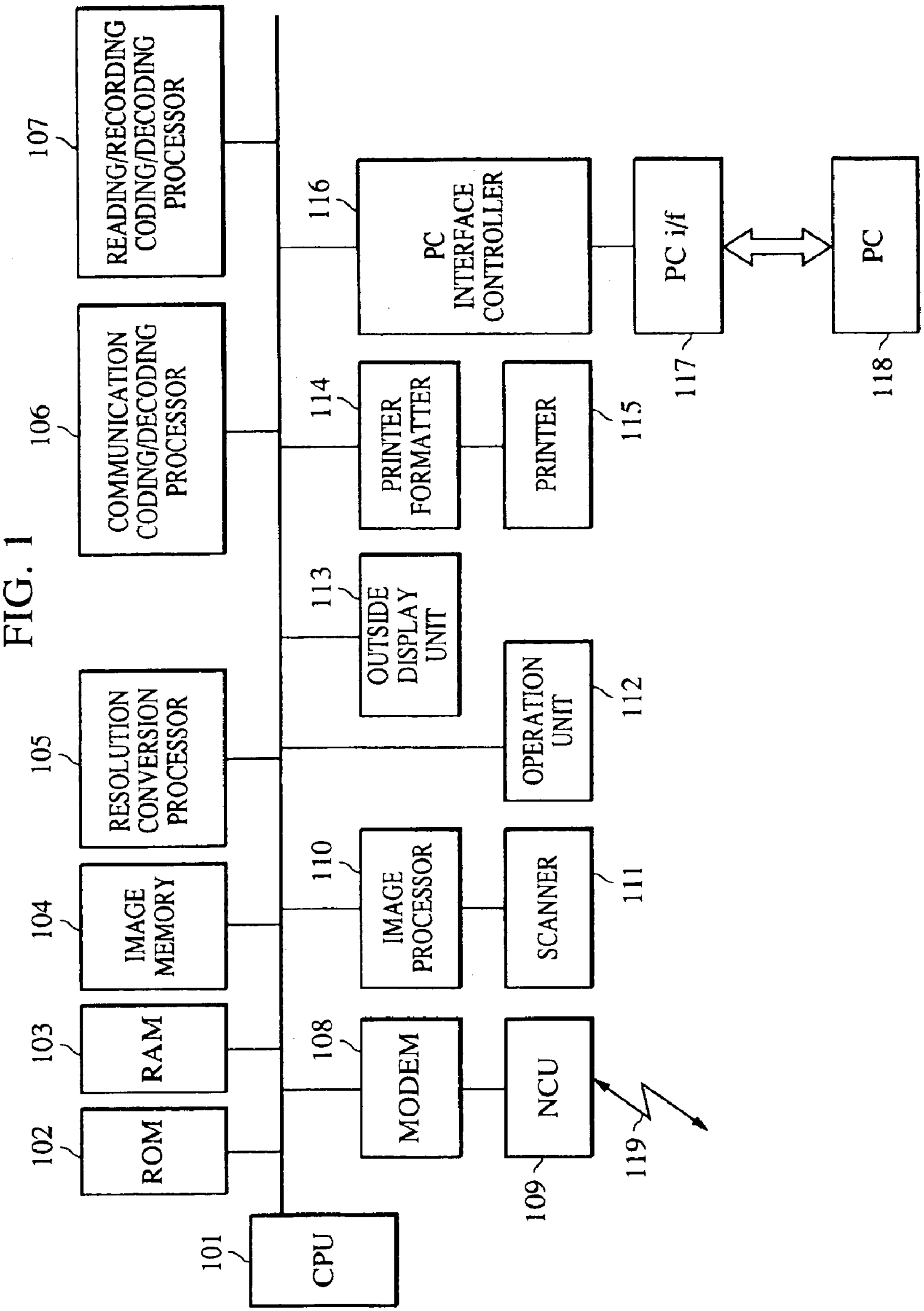
FIG. 1 is a schematic block diagram showing the arrangement of a facsimile apparatus according to the first embodiment of the present invention.

FIG. 1 is a block diagram showing the arrangement of a facsimile apparatus according to an embodiment of the present invention.

Referring to FIG. 1, a CPU 101 is a system controller for controlling the system as a whole. A ROM 102 stores a control program for the CPU 101. A RAM 103 is constituted by an SRAM or the like to store program control variables or the like. Set values such as destination information, management data of the system, and various work buffers which are registered by an operator are also stored in the RAM.

An image memory 104 is constituted by a DRAM or the like to accumulate image data. A resolution conversion processor 105 performs resolution conversion control such as millimeter-inch conversion of raster data. A communication coding/decoding processor 106 performs communication coding when a coding scheme in a reading/recording operation is different from a coding scheme in communication. A reading/recording coding/decoding processor 107 performs a coding/decoding process for image data in a reading/recording operation.

A MODEM 108 modulates/demodulates a facsimile transmission/reception signal, and an NCU 109 has a function of transmitting a selection signal (dial path or tone dialer) to a communication line (PSTN) 119 and also performs an automatic incoming operation by detecting a calling tone.

A scanner 111 is constituted by a CS image sensor, an original convey mechanism, and the like to optically read an original to electrically convert the read data into an image data. An image processor 110 performs a correction process to the read image data to output high-precision image data.

An operation unit 112 is constituted by a keyboard or the like, and is used when an operator performs various input operations. An outside display unit 113 is used to cause an LCD, an LED, or the like to perform notification by a display to a user.

When file data from a PC or the like is printed, a printer formatter 114 analyzes a printer description language to convert the data into image data. A printer 115 is a device for recording a reception image or a file data on a sheet of recording paper as a visible image.

A PC interface controller 116 performs data processing to exchange data with a PC. The PC interface controller 116 is connected to PC (Personal Computer) 118 through a PC i/f 117.

This facsimile apparatus not only transmit facsimile data on the basis of a designation from the operation unit 112 but also receives a transmission designation command from the PC 118 through the PC i/f 117 to transmit facsimile data.

Figure 2:
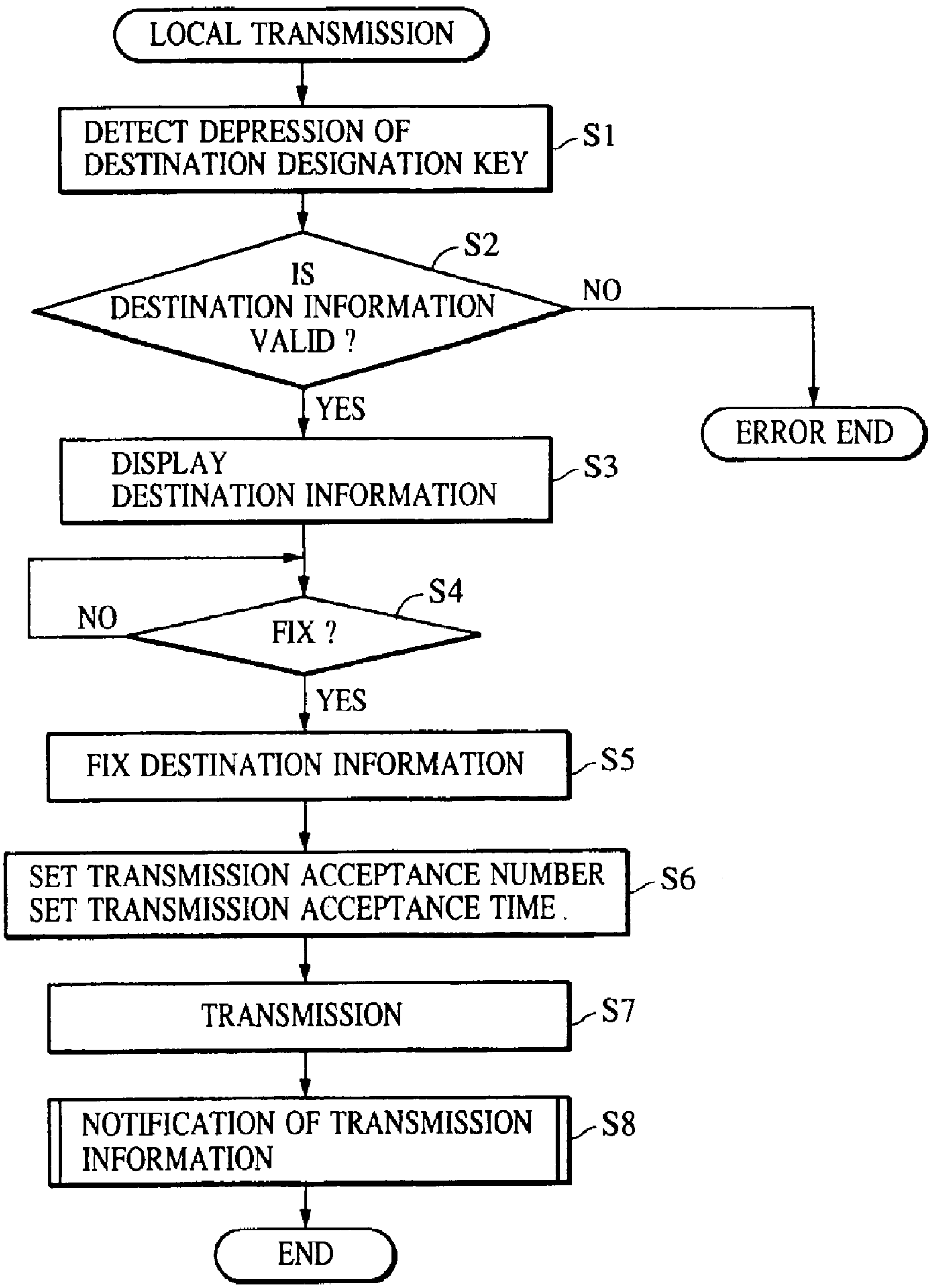
FIG. 2 is a flow chart showing a flow of processes performed by the facsimile apparatus in FIG. 1.

FIG. 2 is a flow chart showing a flow of processes performed when image data is transmitted by an operation from the operation unit 112 of the facsimile apparatus in FIG. 1. This flow chart shows a flow of control performed by the CPU 101 on the basis of program data stored in the ROM 102.

When it is detected that a destination designation key, e.g., a one-touch dial key or a compaction dial key, on the operation unit 112 is pressed by an operator (step S1), destination information in the RAM 103 corresponding to the pressed destination designation key is checked (step S2). If the contents of the information are invalid or do not correspond to any data, an error end process is performed.

If the contents are valid data, corresponding destination information is displayed on the outside display unit 113 (step S3). Thereafter, when a key operation for fixing a destination is performed or a predetermined period of time has elapsed (step S4), after fixing conditions are established, destination information is fixed (step S5).

After a transmission acceptance number and transmission acceptance time which are inherent in each communication are set (step S6), the image of an original on an original table of the scanner 111 is read, and the facsimile data (read image data) is transmitted to the destination fixed in step S5 through the communication line (PSTN) 119 according to T.30 of ITU-T (step S7). Upon completion of transmission, transmission information is automatically notified to the PC 118 through the PC interface 117 (step S8).

The notification of transmission information may be performed at once after the transmission. Each time a transmission state changes, necessary information may be notified one by one at timings such as a dial start timing, a previous procedure start timing, an image data transmission start timing of each page, or a communication end timing.

Figure 3:
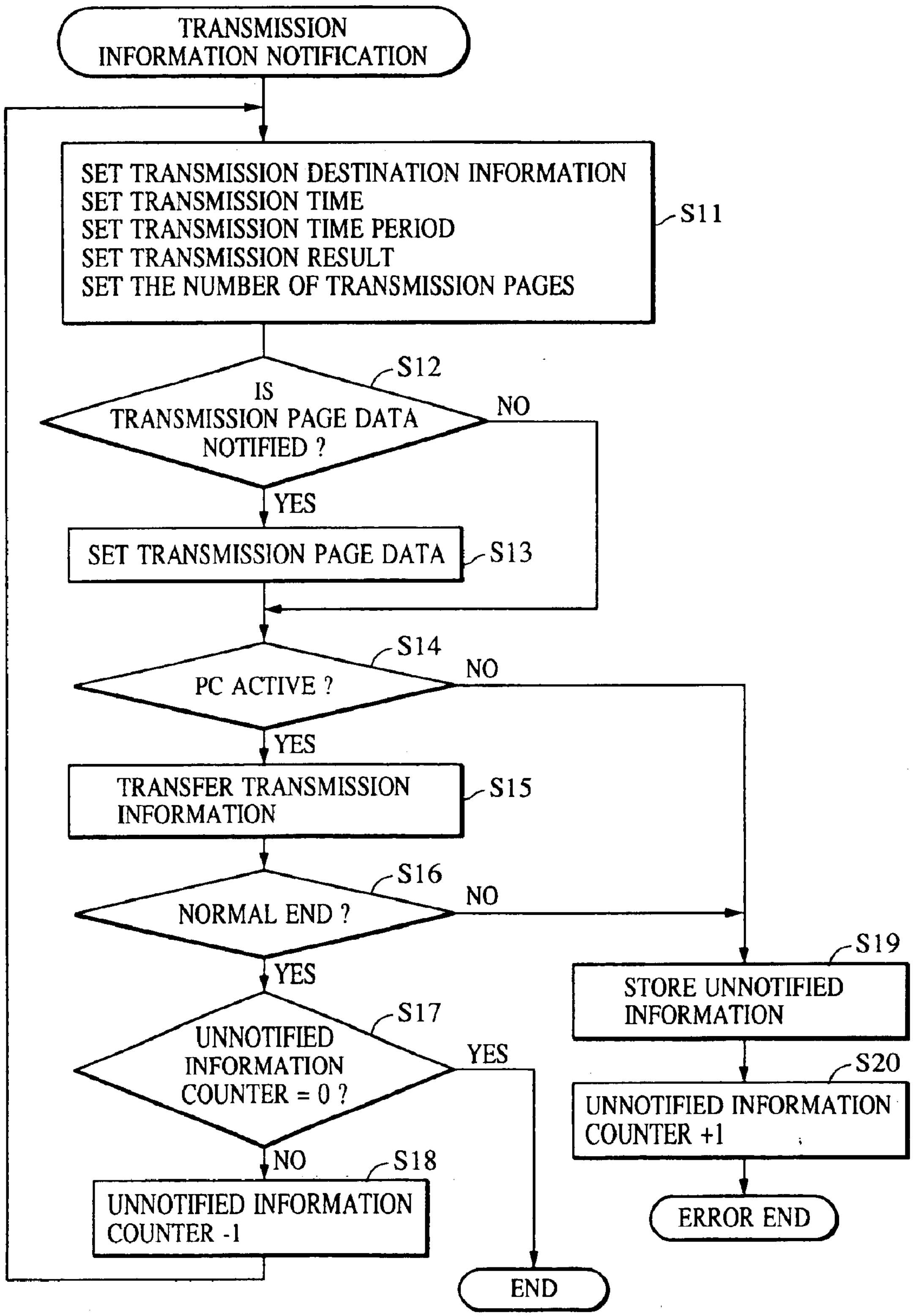
FIG. 3 is a flow chart showing a flow of processes performed by the facsimile apparatus in FIG. 1.

FIG. 3 is a flow chart showing a flow of transmission information notification processes in step S8 in FIG. 2.

When the notification timing has been set in the RAM 103, and the notification is performed at once upon completion of the transmission, all the pieces of transmission information are notified to the PC 118 at once. When the pieces of transmission information are designated to be notified one by one each time a transmission state changes, each time a piece of transmission information to be notified is fixed, one piece of transmission information is notified to the PC 118.

Of transmission information to be notified such as information related to a transmission destination, transmission start/end time, a communication time, a communication result (OK or NG), and the number of transmission pages, pieces of fixed information are set in a notification data buffer in the RAM 103 (step S11). A setting for determining whether the transmission information includes transmission image data is checked (step S12). When the transmission image data is set to be notified, the identification information of the transmission image data is set (step S13).

It is checked whether the PC 118 can give or receive data (step S14). If the PC 118 can give or receive data, the data is transferred on the basis of information set in the notification data buffer (step S15). If the PC 118 cannot give or receive data, or the transfer operation is not normally ended after the transfer operation is ended (step S16), the data is stored as unnotified information on the basis of data in the notification data buffer (step S19). A method of accumulating data in the RAM 103 as a file or a method of writing data in a storage data region in the RAM 103 may be used. At this time, an unnotified information count is incremented by 1 (step S20).

If the transmission information notification is normally ended, the value of the unnotified information counter is checked (step S17). If the value is not 0, the value of the unnotified information counter is decremented by 1, and the flow returns to step S11 to repeat transmission information notification. If the value is 0, the operation is ended.

In FIGS. 2 and 3, although information is notified from the facsimile apparatus to the PC 118, the PC 118 may ask the facsimile apparatus to acquire information.

Figure 4:
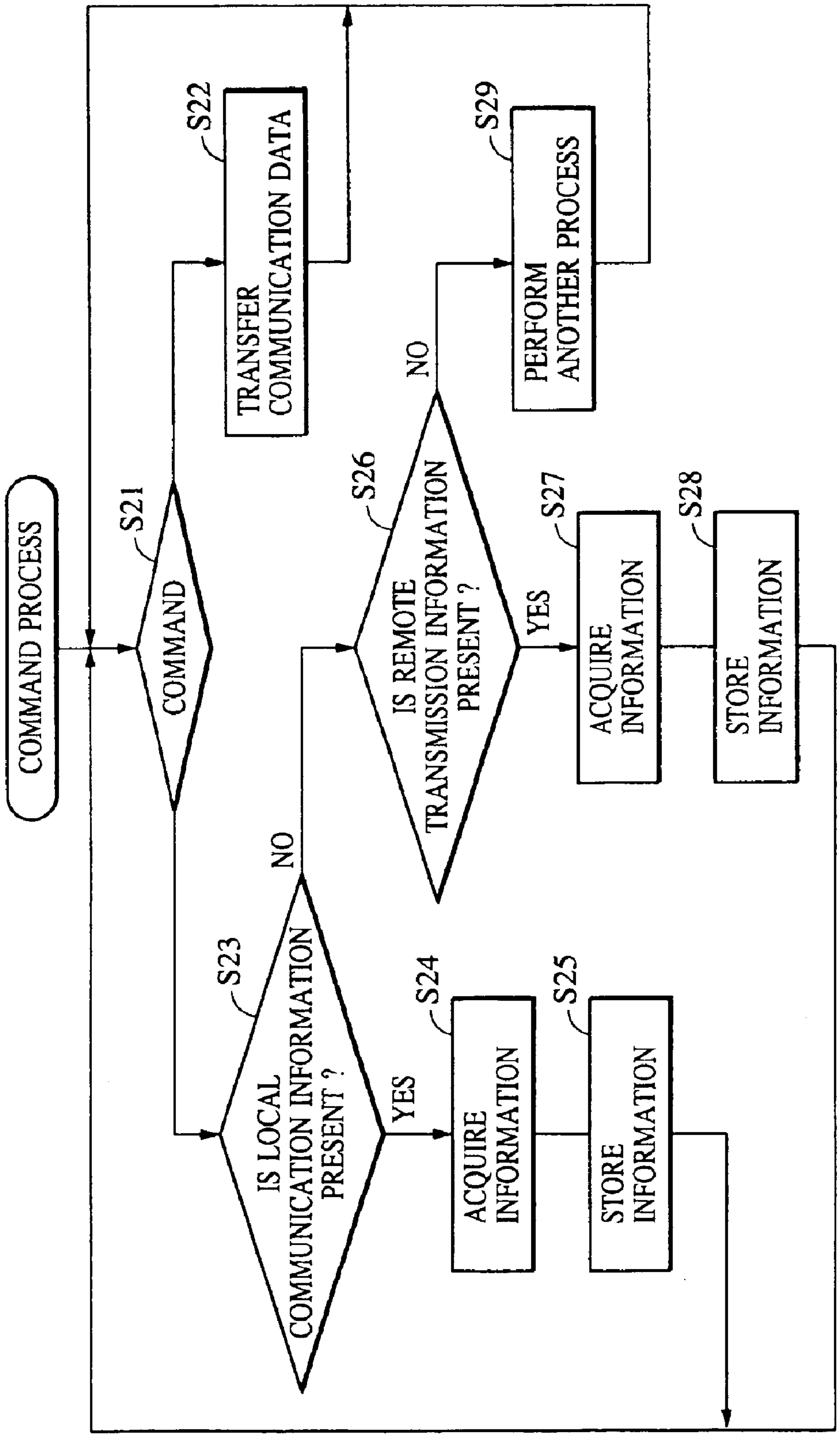
FIG. 4 is a flow chart showing a flow of processes performed by a PC 118.

FIG. 4 is a flow chart showing a flow of processes performed by the PC 118. This flow chart shows a flow of processes performed by the CPU of the PC 118 on the basis of a program installed in a hard disk of the PC 118.

The PC 118 transmits a command to a facsimile apparatus through the PC i/f (step S21). If this command is a transmission request command, transmission image data, destination information, and the like are transferred to the facsimile apparatus to cause the facsimile apparatus to transmit the transmission image data to the destination (step S22).

On the other hand, if the command is a polling command, information in a predetermined area of the RAM 103 of the facsimile apparatus is checked. In this case, it is checked whether information representing whether various pieces of information in the RAM 103 or the state of the system changes. If the information or state changes, the corresponding information is drawn.

In step S23, it is checked whether the information is local transmission information, i.e., information related to transmission based on a designation from the operation unit 112 of the facsimile apparatus. If YES in step S23, this information is acquired (step S24), information for determining local transmission or remote transmission and the above transmission information are stored in the hard disk of the PC 118 (step S25).

In step S26, it is checked whether the information is remote transmission information, i.e., information related to transmission based on a transmission request command from the PC 118. If YES in step S26, the transmission information is acquired as described above (step S27), and the transmission information is stored (step S28). On the other hand, if NO in step S26, another process is performed (step S29).

The information stored in step S25 or S28 can be displayed on the display unit or printed out by the printer if necessary.

(Second Embodiment)

Figure 5:
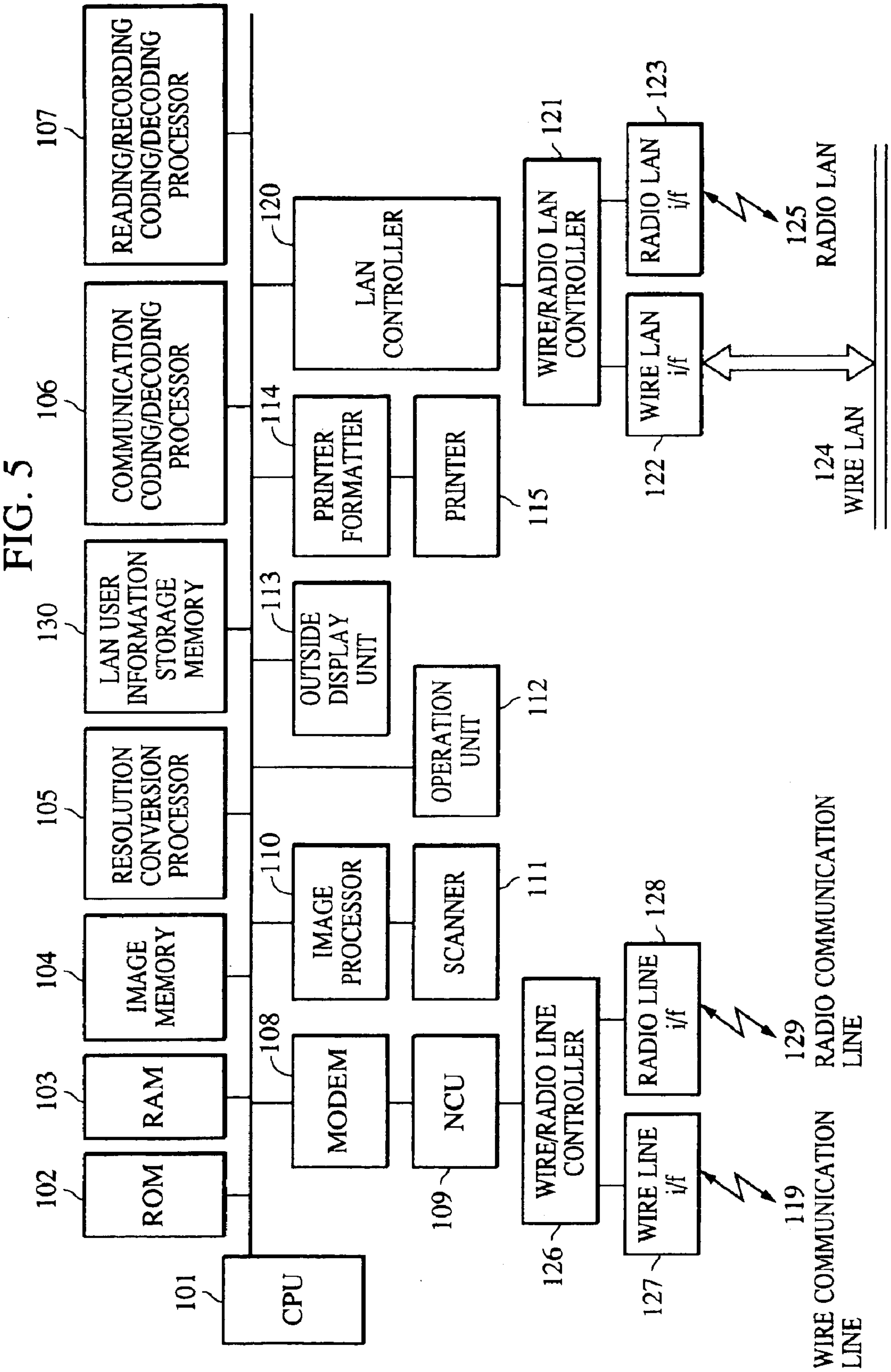
FIG. 5 is a schematic block diagram showing the arrangement of a facsimile apparatus according to the second embodiment of the present invention.

FIG. 5 is a block diagram showing the arrangement of a facsimile apparatus according to the second embodiment.

Since the same reference numerals as in FIG. 1 denote the same parts in FIG. 5, a description thereof will be omitted.

A LAN controller 120 performs data processing to exchange data with a server or a terminal on a wire LAN 124 or a radio LAN 125. A wire LAN i/f 122 is an interface for connecting the facsimile apparatus to the wire LAN 124, and a radio LAN i/f 123 is an interface for connecting the facsimile apparatus to the radio LAN 125. The wire LAN i/f 122 and the radio LAN i/f 123 are controlled by a wire/radio LAN controller 121. The NCU 109 in FIG. 5 has a function of transmitting a selection signal (dial pulse or tone dialer) to the wire communication line 119 through a wire line i/f 127 and a function of transmitting the selection signal to a radio communication line 129 through a radio line i/f 128. A wire/radio line controller 126 controls the wire line i/f 127 and the radio line i/f 128. A LAN user information storage memory 130 is a memory for storing information related to a user or a client on a network. The information is displayed on the outside display unit 113 under the control of the operation unit 112, and is selected by an operator. The operation unit 112 in FIG. 5 includes the LAN user destination selection means.

Figure 6:
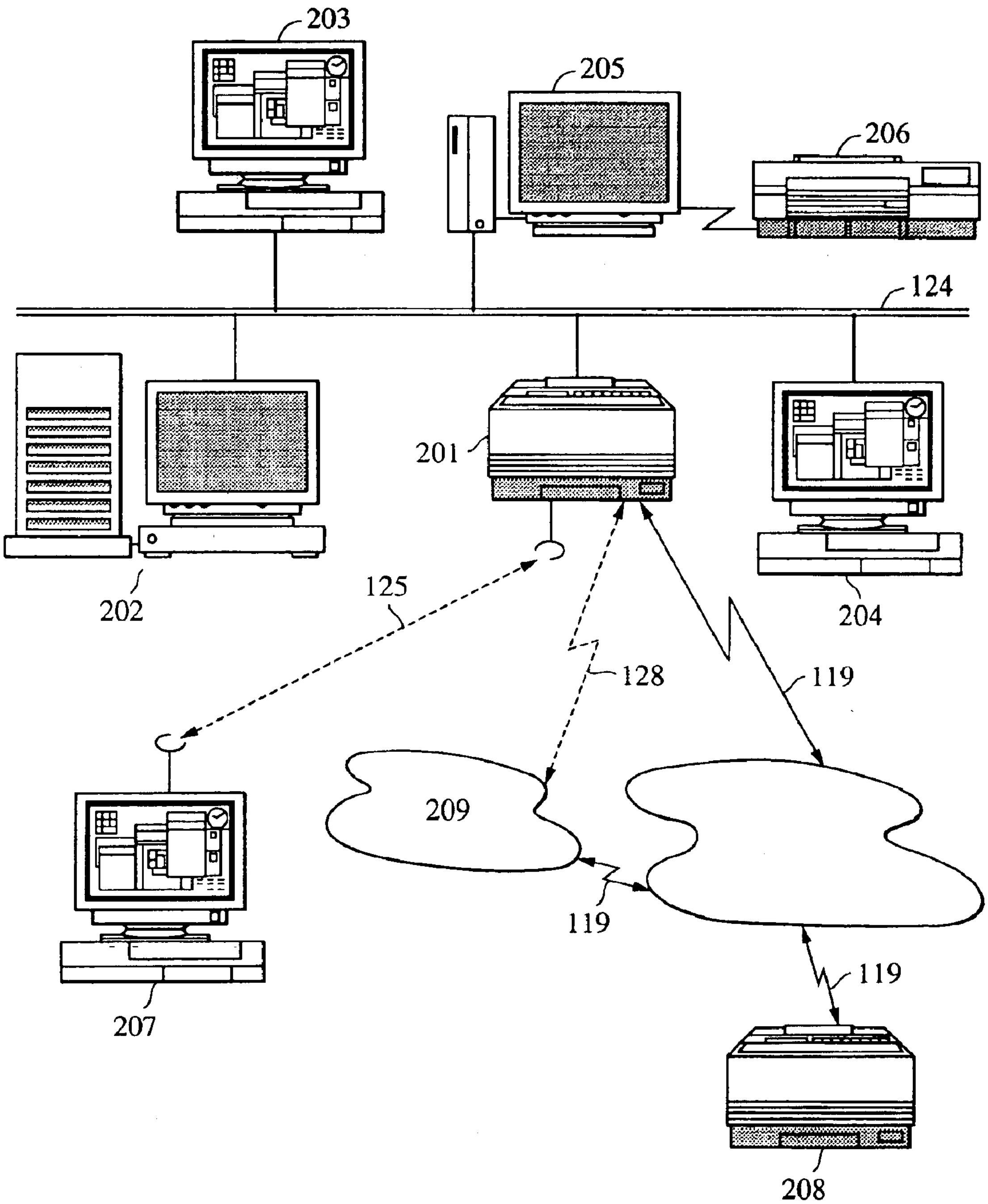
FIG. 6 is a view showing a form in which the facsimile apparatus is connected to a network.

FIG. 6 is a view showing the arrangement of a network to which the facsimile apparatus shown in FIG. 5 is connected.

Reference numeral 201 denotes the facsimile apparatus shown in FIG. 5 which can be connected to the wire LAN 124 and the radio LAN 125.

Reference numeral 202 denotes a server machine of a LAN to which the facsimile apparatus 201 is connected. The server machine manages the LAN in a large-capacity storage device and files on the LAN. A management process and data for a client or a user on the LAN are set in the server machine.

Reference numerals 203 and 204 denote client machines (information processing terminals) such as personal computers connected to the wire LAN 124.

Reference numeral 205 denotes a printer server which accepts a print request from the client machine to perform a control operation for outputting data to be printed to a printer. Reference numeral 206 denotes a printer for outputting image data onto a sheet of recording paper as a visible image.

Reference numeral 207 denotes a client machine connected to the radio LAN 125.

Reference numeral 208 denotes a facsimile apparatus which communicates with the facsimile apparatus 201 through the PSTN 119.

Reference numeral 209 denotes a radio base station which performs facsimile communication with the facsimile apparatus 201 through the radio line i/f 128. The radio base station 209 is connected to a wire communication line network through the PSTN 119.

Figure 7A:
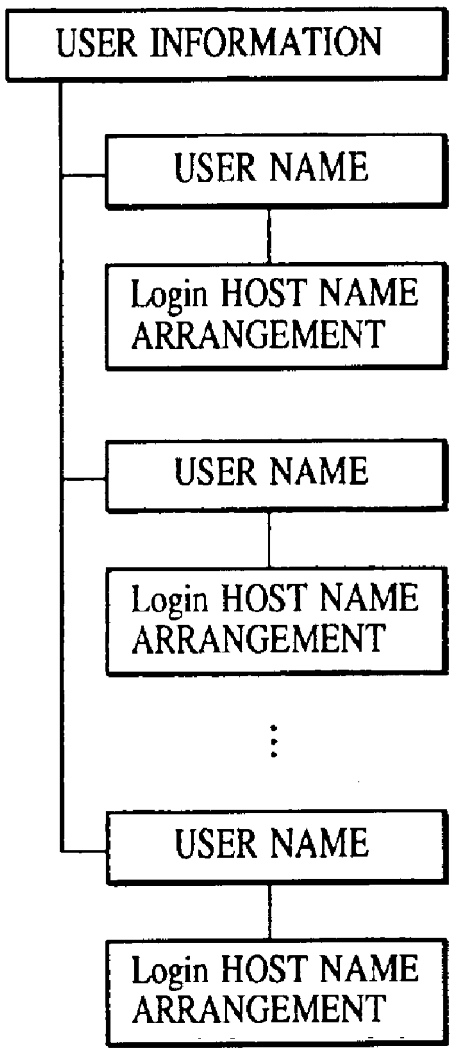
FIGS. 7A and 7B are views showing information managed by the storage device of a server machine 202.
Figure 7B:
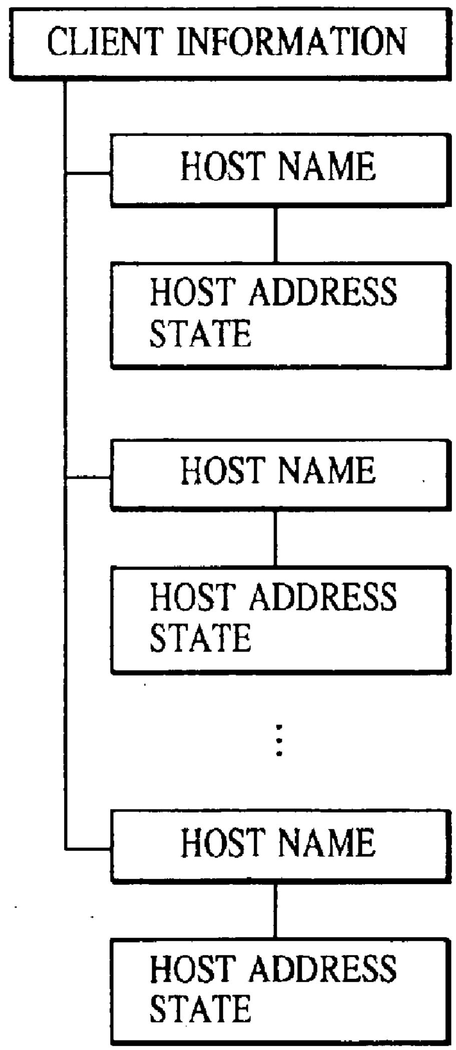

FIGS. 7A and 7B are views showing the contents of management information for a user and a client on a LAN managed by the server machine 202. The management information is stored in the storage device of the server machine 202.

As the user information, information related to an authorized user on the LAN is managed. A user name and a host name of a host machine which a user logs in are managed for each user. A user name and a login host name are data of a text string which can be read by the CPU of the server machine 202.

As the client information, information related to a client machine connected to a LAN is managed. A host address on a network of the client machine and the state of the client machine are managed for each client. The host address is used as data such as 123. 456. 789. 001 in TCP/IP protocol, and connection and non-connection are used as the state of the client machine.

Figure 8:
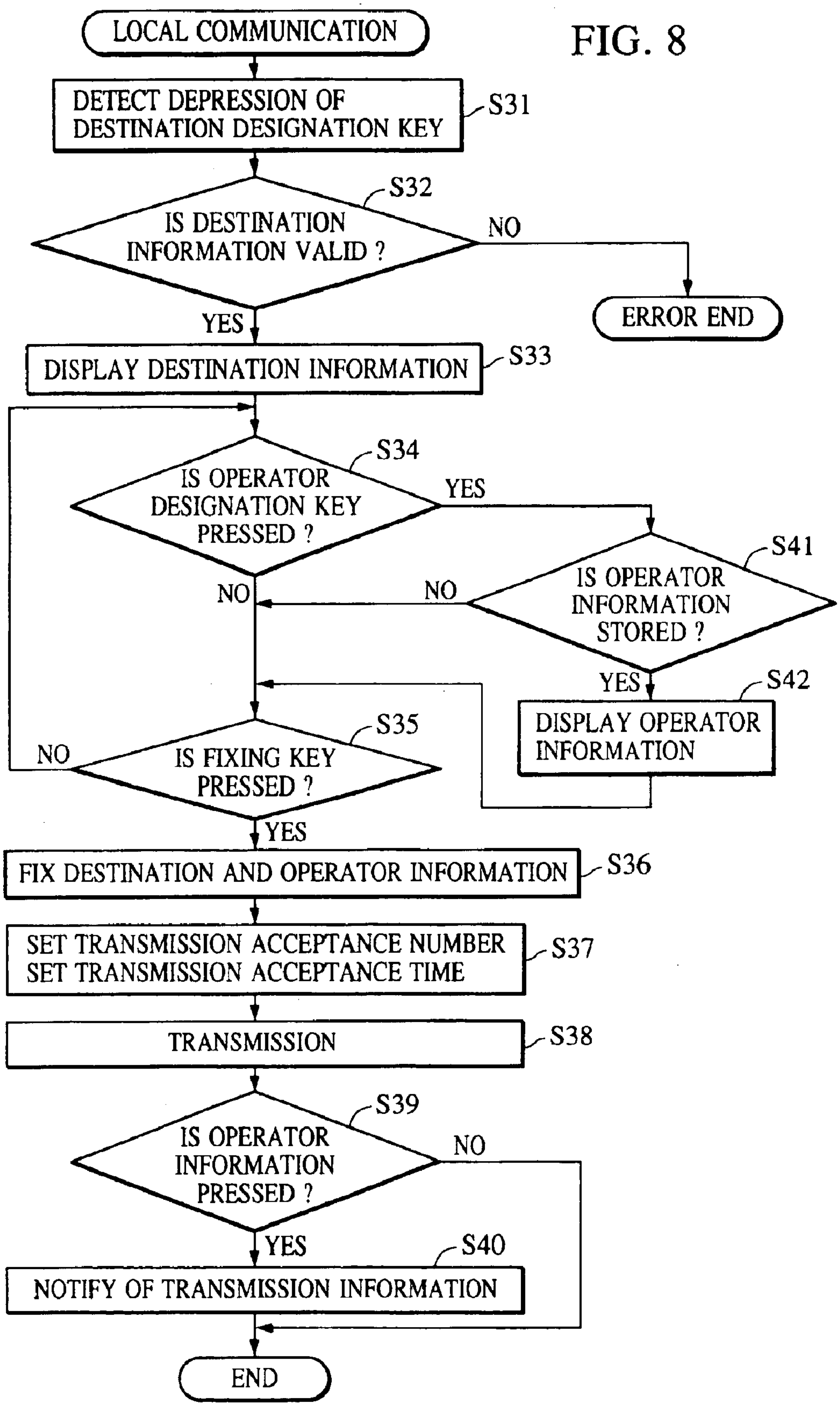
FIG. 8 is a flow chart showing a flow of processes performed by a facsimile apparatus 201.

FIG. 8 is a flow chart showing a flow of processes performed when image data is transmitted by an operation from the operation unit 112 of the facsimile apparatus 201. This flow chart shows a flow of control performed by the CPU 101 on the basis of program data stored in the ROM 102.

When it is detected that a destination designation key, e.g., a one-touch dial key or a compaction dial key, on the operation unit 112 is pressed by an operator (step S31), destination information in the RAM 103 corresponding to the pressed destination designation key is checked (step S32). If the contents of the information is invalid or do not correspond to any data, an error end process is performed.

If the contents are valid data, corresponding destination information is displayed on the outside display unit 113 (step S33). Thereafter, a key input operation for designating an operator (user name) and a key operation for fixing a destination are performed, or the CPU waits until a predetermined period of time has elapsed (step S35). When the key for designating an operator is pressed (step S34), it is determined whether corresponding operator information is stored in the RAM 103 (step S41). If the information is stored in the RAM 103, the operator information is displayed (step S42). After fixing conditions are established, the destination information and the operator information are fixed (step S36).

After a transmission acceptance number and transmission acceptance time which are inherent in each communication are set (step S37), the image of an original on an original table of the scanner 111 is read, and the facsimile data (read image data) is transmitted to the destination fixed in step S36 through the communication line 119 or 129 according to T.30 of ITU-T (step S38). Upon completion of transmission, it is checked whether operator information is designated (step S39). If the operator information is designated, transmission information and the operator information are notified to the server machine 202 through the wire LAN i/f 122 (step S40).

The notification of transmission information may be performed at once after the transmission. Each time a transmission state changes, necessary information may be notified one by one at timings such as a dial start timing, a previous procedure start timing, an image data transmission start timing of each page, a communication end timing. In addition, no operator information is designated, data representing that an operator is not known and the transmission information may be notified.

Figure 9:
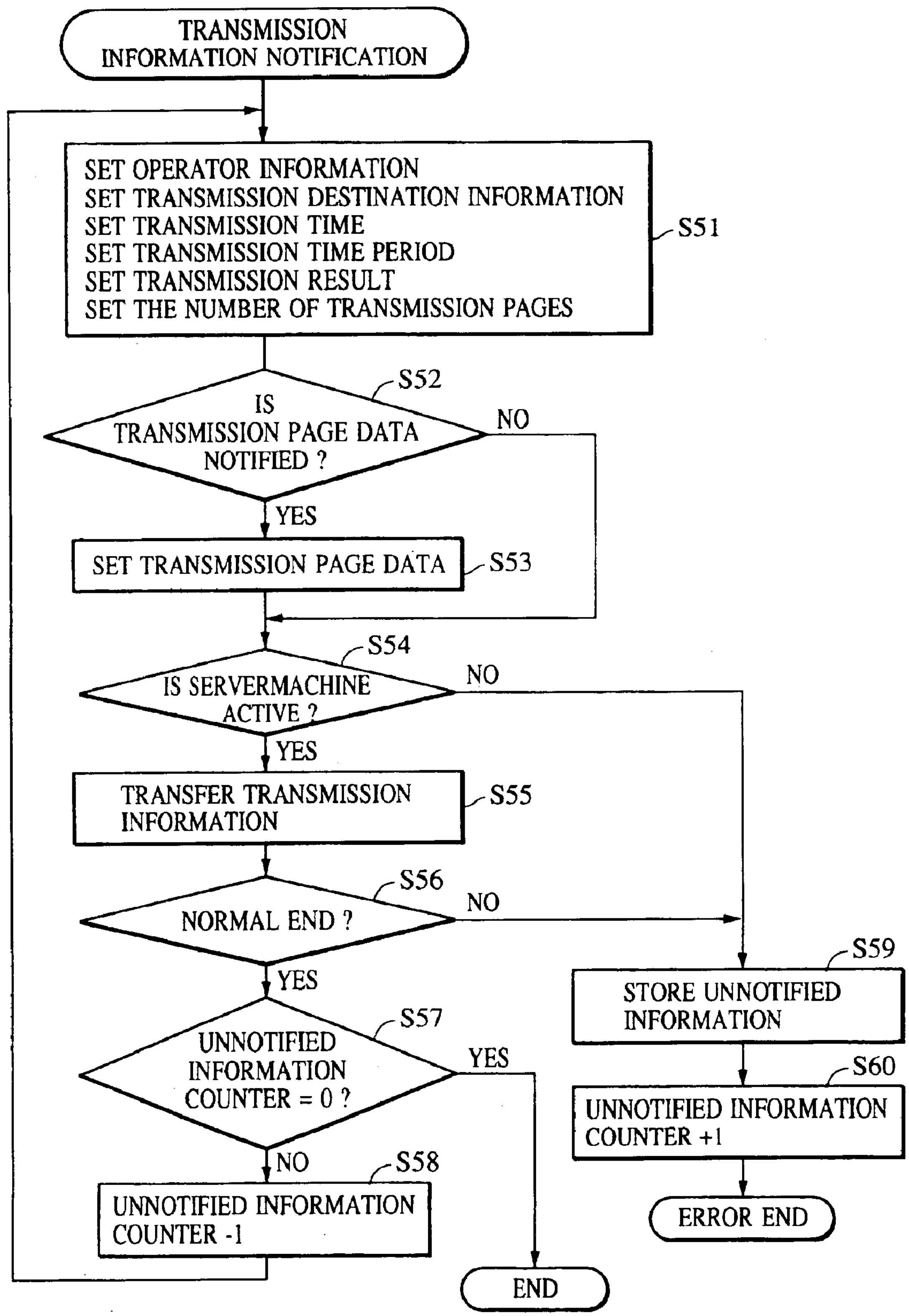
FIG. 9 is a flow chart showing a flow of processes performed by a facsimile apparatus 201.

FIG. 9 is a flow chart showing a flow of transmission information notification processes in step S40. The flow of processes is substantially the same as that in the flow chart shown in FIG. 3 except for the following points. That is, the information set in step S11 in FIG. 3 and the operator information fixed in step S36 are set in step S51, the PC in step S14 in FIG. 3 is replaced with the server machine 202 in step S54, and transmission information including operator information is transferred. The image data transmitted to a destination is also transferred in step S55.

Processes performed by the server machine 202 will be described below.

Figure 10:
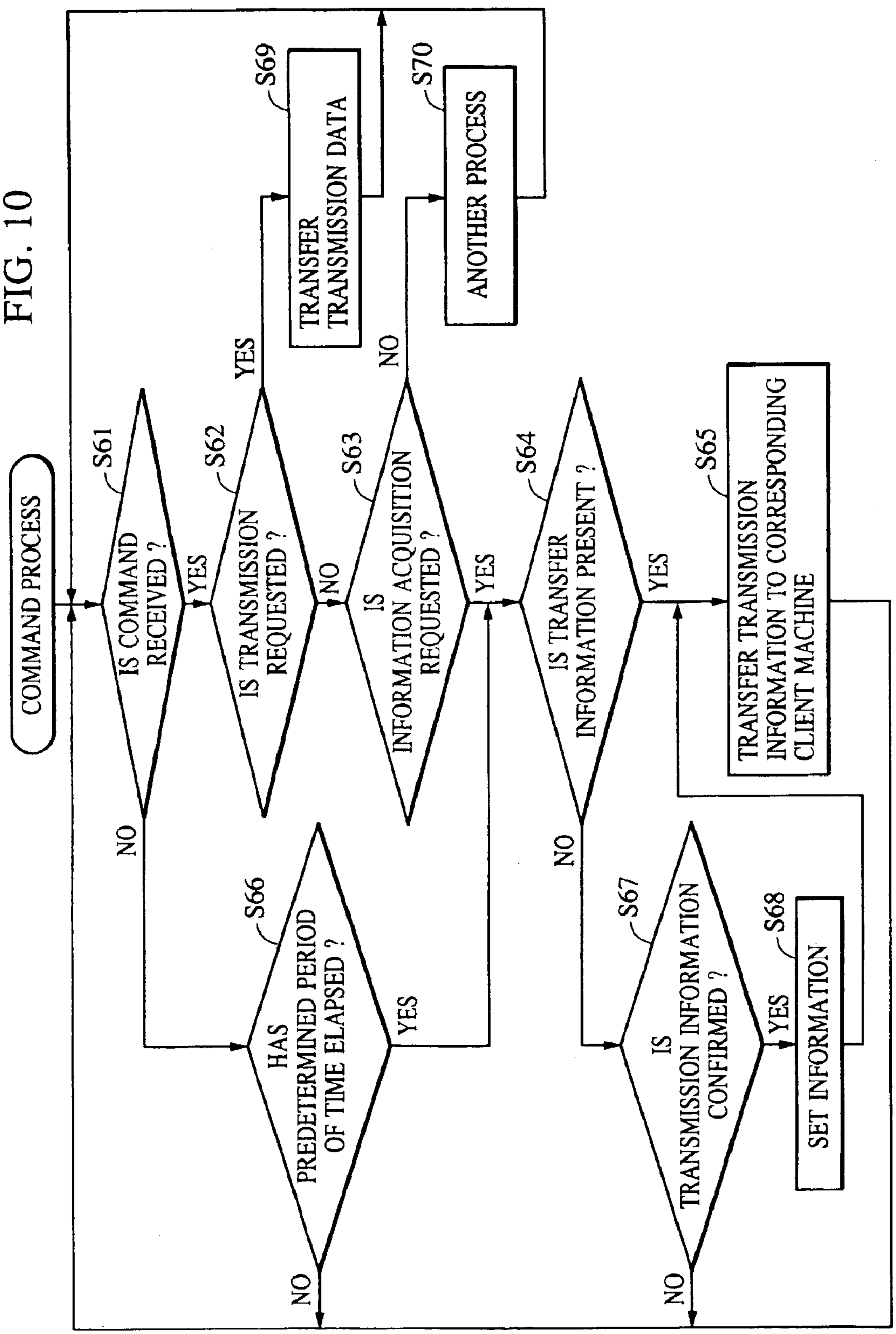
FIG. 10 is a flow chart showing a flow of processes performed by the server machine 202.

FIG. 10 is a flow chart showing a flow of control executed by the CPU of the server machine 202 on the basis of program data installed in a storage device arranged in the server machine 202.

In step S61, it is checked whether a command from a client machine on the LAN is received through the wire LAN i/f 122 or the radio LAN i/f 123. If it is determined that the command is not received after a predetermined period of time has elapsed in step S66, the flow goes to step S64. If the command is received, it is checked whether the command is a transmission request (step S62). If the command is a transmission request, transmission request data is transferred to the facsimile apparatus 201 together with data to be transmitted (step S69).

If it is determined in step S63 that the command is a information acquisition request, the flow shifts to step S64 to check whether transmission information which is requested (corresponds to an operator (user) who requests) is stored in the storage device of the server machine 202. If the transmission information is stored, operator information, transmission information including information representing local transmission or remote transmission, and image data corresponding to the transmission information are transferred (step S65).

On the other hand, if information to be transferred is not stored in the storage device in step S64, it is asked whether the corresponding transmission information is stored in the RAM 103 of the facsimile apparatus 201 (step S67). If YES in step S67, the transmission information is acquired and set in the storage device (step S68). The transmission information is transferred in step S65. If it is determined in step S63 that the command is not the information acquisition request, another process is performed (step S70).

Processes performed by a client machine (e.g., the client machine 203, 204, or 207) according to the second embodiment will be described below. Here, in particular, acquisition and storage of transmission information, a display of the transmission information, and the like are described.

Figure 11:
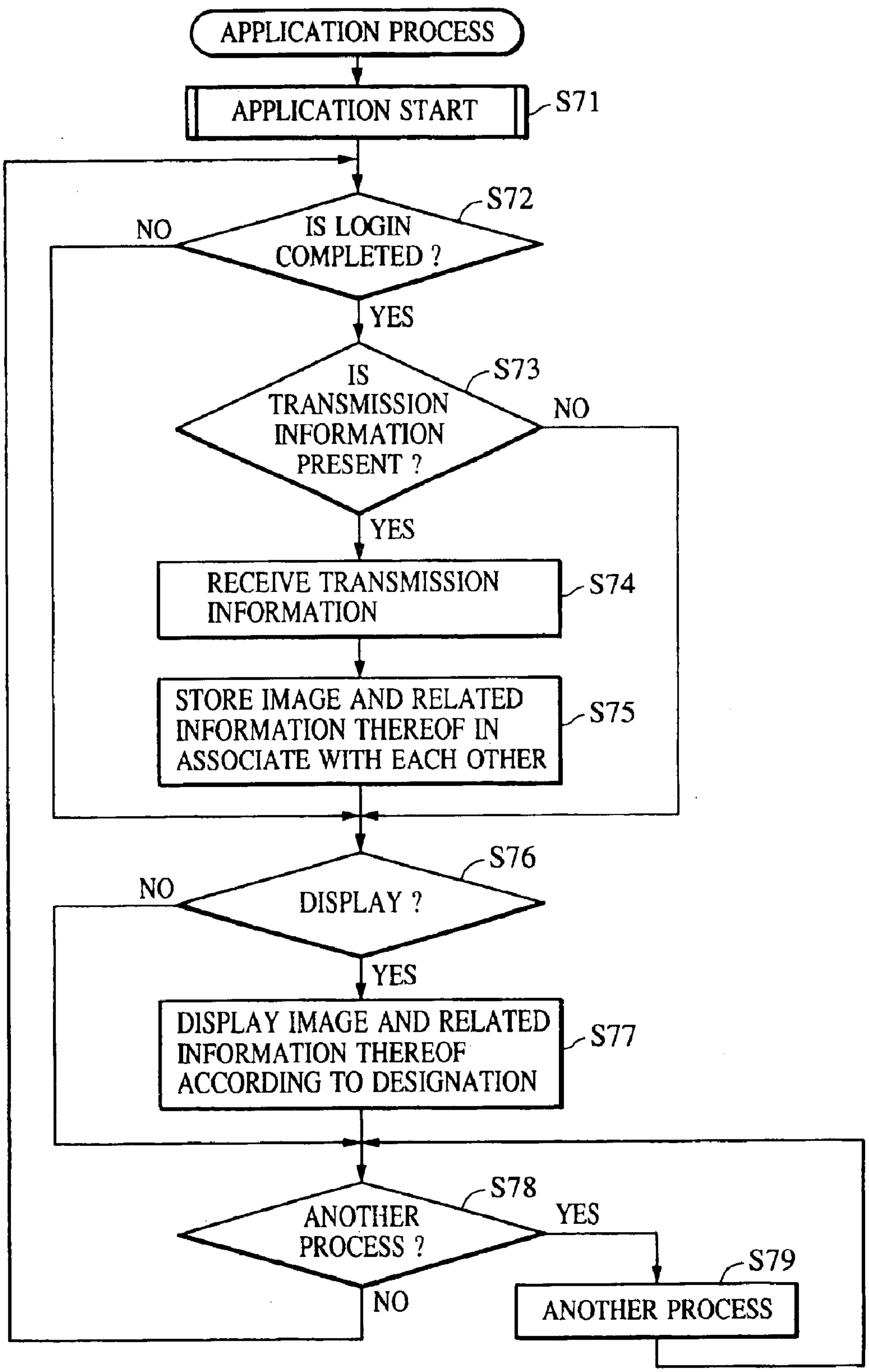
FIG. 11 is a flow chart showing a flow of processes performed by a client machine.

FIG. 11 is a flow chart showing the flow of the processes based on an application program installed in the client machine. This flow chart shows the flow of control performed by the MPU of the client machine to read and execute a program installed in the hard disk managed under the control of the MPU.

In step S71, the application program is started. This application program exchanges data with the facsimile apparatus 201 through the wire LAN 124 and the radio LAN 125 to perform management and processes for image data or information related to the image data.

In step S72, it is checked whether a user performs a login procedure to the wire LAN 124 or the radio LAN 125. If YES in step S72, the flow shifts to step S73 to check whether transmission information (including image data) which has not transferred is stored in an area corresponding to a login user name in the storage device of the server machine 202.

If the transmission information which has not transferred is stored, the flow shifts to step S74 to read and receive the transmission information by transmission of a command. The received transmission information is stored in the hard disk of the client machine in step S75 in such a manner that the image data is caused to correspond to the information related to the image data. Here, the image data is image data obtained by reading an original by the scanner 111 of the facsimile apparatus 201, and the related information includes destination information, a transmission acceptance time/date, an acceptance number, a transmission time/date, the number of pages, an image size, a resolution, information representing transmission success/failure (also representing the contents of an error), information representing local transmission or remote transmission, and the like when the image data is transmitted through the PSTN 119 or the radio communication line 129.

In step S76, it is checked whether the display of transmission information is selected. If the display of transmission information is selected, the flow shifts to step S77 to display the image of transmission information selected by a designation of a user and information related to the transmission information on the display unit of the client machine. Here, transmission information can be designated by searching performed by various methods such as inputting of acceptance number and inputting of transmission destination. At this time, information representing local transmission performed by an operation from the operation unit 112 of the facsimile apparatus 201 or remote transmission for causing the facsimile apparatus 201 to transfer and transmit image data to the facsimile apparatus 201 by a command output from the client machine and using the application program is also displayed.

In step S78, it is determined checked that still another process, e.g., print out, a designation of another transmission, or erasing of data is performed. If YES in step S78, the process is executed in step S79.

According to the embodiments described above, not only information related to transmission performed by a remote operation from a PC or the like but also information related to transmission performed by a local operation from the operation unit of the facsimile apparatus can be managed together in the PC side. This is an advantage for a user who generally works on the PC side. In addition, since remote transmission and local transmission are independently managed on the PC side, the conditions can be easily recognized. Since an image is also displayed, a user can more easily recognize the conditions.

Especially, according to the second embodiment, in local transmission, since whether transmission information is notified or not is controlled by checking whether operator information is input or not, a user ban arbitrarily determine whether the transmission information is managed on the PC side.

As needed, the server machine 202 can manage transmission information of all users on a LAN and, individual transmission information of users is transferred to the client machines of the users. Each user can independently manage remote transmission and local transmission.

The present invention may be applied to a system constituted by a plurality of machines (e.g., a host computer, an interface device, a reader, a printer, and the like) or to a system constituted by one machine (e.g., a copying machine or a facsimile apparatus).

A program code of software for realizing the above embodiments is supplied to an apparatus connected to various devices or a computer in the system such that various devices are operated to realize the functions of the embodiments, and the various devices are operated by the system or the computer (CPU or MPU) of the system according to the program stored in the system or the computer. This arrangement can also be included in the scope of the present invention.

In this case, the program code itself of software realizes the functions of the embodiments. The program code itself and a means for supplying the program code to the computer, e.g., a storage medium in which the program code is stored, constitute the present invention.

As a storage medium for storing the program code, a floppy disk, a hard disk, an optical disk, a CD-ROM, a magnetic tape, a non-volatile memory card, a ROM, or the like can be used.

When the computer executes the supplied program code, the functions of the above embodiments are realized. In addition, when the functions of the embodiments are realized in such a manner that the program code operates together with an OS (Operating System) operating in the computer or another application software, the program code is included in the embodiments of the present invention as a matter of course.

Furthermore, after the supplied program code is stored in a memory arranged on a function extension board of the computer or a function extension unit connected to the computer, a CPU or the like arranged on the function extension board or the function extension unit performs part or all of the actual processes on the basis of the designation of the program code, and the functions of the embodiments are realized by the processes. This case is also included in the present invention as a matter of course.

The present invention has been described above on the basis of the preferred embodiments. However, the present invention is not limited to the embodiments, and various modification can be effected within the range described in the claims.

What is claimed is:

1. A data communication system comprising:

a connector, adapted to connect a network, which is connectable to a plurality of data processing terminals, to said data communication system;

an operation input unit, adapted to input a manual designation from an operator and to input address of an external data communication terminal;

a designation unit, adapted to designate an ID for specifying a data processing terminal on the network connected by said connector based on the manual designation inputted using said operation input unit;

a data transmitter, adapted to transmit a document based on a designation of an address input by said operation input unit, the document being transmitted to an external data communication terminal via a line that does not include said connector;

a transfer unit, adapted to transfer the address of the external data communication terminal, communication result information representing a document transmission performed by said data transmitter based on the designation input by said operation input unit, and the document transmitted by said data transmitter to one of the plurality of data processing terminals connected by said connector upon completion of the document transmission performed by said data transmitter;

a determination unit, adapted to determine whether or not an ID is designated by said designation unit; and a transfer control unit, adapted to control said transfer unit in accordance with a determination result by said determination unit, wherein the data processing terminal, corresponding to the ID designated by said designation unit, stores the communication result information and the document transferred by said transfer unit which correlate to each other.

2. A data communication system according to claim 1, wherein said transfer unit does not transfer the information in absence of an ID designated by said designation unit.

3. A data communication system according to claim 1, wherein the ID designated by said designation unit is information representing a user on the network.

4. A data communication system according to claim 1, wherein said data transmitter transmits the document, based on the designated ID, from the data processing terminal connected to said data communication system via said connector.

5. A data communication system according to claim 1, wherein the information transferred by said transfer unit includes at least one of a transmission destination, a transmission time, and a number of transmission pages.

6. A method of controlling a system that includes a data communication system for performing document communication with a destination and a data processing terminal for controlling the data communication system, the data communication system being connected to the data processing terminal via a network that is connectable to a plurality of data processing terminals, said method comprising the steps of:

at the data communication system:

inputting a designation manually entered by an operator using an operation input unit;

designating an ID based on the manual designation inputted using the operation input unit;

performing document communication with an external data communication terminal in accordance with a designation inputted using the operation input unit; and notifying the data processing terminal corresponding to the designated ID, via a connector connecting the data communication system and the data processing terminal, wherein notification includes communication result information representing the document communication with the external data communication terminal based on the inputted designation, and a document transmitted by the data communication system, and at the data processing terminal:

instructing the data communication system to communicate with a destination;

receiving communication result information notified by the data communication system in said notifying step; and independently storing the communication result information related to the document communication based on an instruction in said instructing step and communication result information received from the data communication system in said receiving step, wherein said notifying step notifies the data processing terminal of the communication result information related to the document communication upon completion of the document transmission performed by the data communication system, and said notifying step includes notifying, in a case where user information is input using the operation input unit with an address of the external data communication terminal, a data processing terminal corresponding to the user information of the communication result information.

* * * * *

UNITED STATES PATENT AND TRADEMARK OFFICE

CERTIFICATE OF CORRECTION

PATENT NO. : 6,937,366 B2
DATED : August 30, 2005
INVENTOR(S) : Seishi Ejiri

It is certified that error appears in the above-identified patent and that said Letters Patent is hereby corrected as shown below:

Title page,
Item [56], References Cited, FOREIGN PATENT DOCUMENTS, "9018498 A" should read -- 9-18498 A --.

Drawings,
Sheet 9, Fig. 9, "SERVERMACHINE" should read -- SERVER MACHINE --.

Column 2,
Line 22, "of the present invention" should be deleted.

Column 3,
Line 7, "transmit" should read -- transmits --.

Column 4,
Line 53, "(step S28). On" should read -- (step S28). ¶ On --.

Column 6,
Line 10, "is" should read -- are --.

Column 7,
Line 22, "(step S65). If" should read -- (step S65). ¶ If --.

Column 8,
Line 32, "ban" should read -- can --; and
Line 36, "and," should read -- and --.

UNITED STATES PATENT AND TRADEMARK OFFICE

CERTIFICATE OF CORRECTION

PATENT NO. : 6,937,366 B2
DATED : August 30, 2005
INVENTOR(S) : Seishi Ejiri

It is certified that error appears in the above-identified patent and that said Letters Patent is hereby corrected as shown below:

Column 9,
Line 25, "input address" should read -- input an address --; and
Line 59, "in absence" should read -- in the absence --

Signed and Sealed this

Sixteenth Day of May, 2006

JON W. DUDAS
*Director of the United States Patent and Trademark Office*